United States Patent
Goto (10) Patent No.: US 10,774,729 B2
(45) Date of Patent: Sep. 15, 2020

(54) COMPRESSION SELF-IGNITED INTERNAL COMBUSTION ENGINE

(71) Applicant: TOYOTA JIDOSHA KABUSHIKI KAISHA, Toyota-shi (JP)

(72) Inventor: Isamu Goto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/195,937

(22) Filed: Nov. 20, 2018

(65) Prior Publication Data

US 2019/0218958 A1 Jul. 18, 2019

(30) Foreign Application Priority Data

Jan. 18, 2018 (JP) ................... 2018-006126

(51) Int. Cl.
*F02B 23/06* (2006.01)
*F02B 3/06* (2006.01)
(52) U.S. Cl.
CPC ............ *F02B 23/0621* (2013.01); *F02B 3/06* (2013.01); *F02B 2023/0609* (2013.01); *F02B 2023/0612* (2013.01); *F02B 2275/40* (2013.01)

(58) Field of Classification Search
CPC .................... F02B 3/06; F02B 23/0621; F02B 2023/0609; F02B 2023/0612; F02B 2275/40
See application file for complete search history.

(56) References Cited

U.S. PATENT DOCUMENTS

| | | | |
|---|---|---|---|
| 9,051,876 B2 * | 6/2015 | Sato | F02B 77/02 |
| 2009/0260594 A1 * | 10/2009 | Hara | B23P 15/10 |
| | | | 123/193.6 |

FOREIGN PATENT DOCUMENTS

| | | |
|---|---|---|
| JP | 2011-169232 | 9/2011 |
| JP | 2017-66996 | 4/2017 |

\* cited by examiner

*Primary Examiner* — Hieu T Vo
(74) *Attorney, Agent, or Firm* — Oblon, McClelland, Maier & Neustadt, L.L.P.

(57) ABSTRACT

A porous alumina layer with a sealer (i.e., a coating layer) is formed on a top surface or a piston (i.e., a second cavity surface and a second squish surface) and a surface of a bottom surface of a cylinder which forms a cavity area CA (i.e., a first cavity surface). The porous alumina layer without the sealer (i.e., an exposed layer) is formed on a surface of the bottom surface which forms a squish area SA (i.e., a first squish surface).

5 Claims, 5 Drawing Sheets

CROSS-SECTION OF HEAT SHIELDING LAYERS L1 AND L3

FIG. 3

CROSS-SECTION OF HEAT SHIELDING LAYER L2

COMPRESSION SELF-IGNITED INTERNAL COMBUSTION ENGINE

CROSS-REFERENCE TO RELATED APPLICATION

The present disclosure claims priority under 35 U.S.C. § 119 to Japanese Patent Applications No. 2018-006126, filed on Jan. 18, 2018. The contents of these applications are incorporated herein by reference in their entirety.

TECHNICAL FIELD

The present disclosure relates to a compression self-ignited internal combustion engine.

BACKGROUND

JP2011-1692232A discloses a spark-ignited internal combustion engine which has a ceramic-based heat shielding layer on a bottom surface of a cylinder head and a top surface of a piston. In this engine, both the bottom surface of the cylinder head and the top surface of the piston include a squish surface and a non-squish surface. The squish surface is a surface which forms a squish area. The squish area is a narrow space which is formed during the compression cycle by the bottom surface of the cylinder head and the top surface of the piston. The non-squish surface is a surface which does not form the squish area.

In the engine, the heat shielding layer is formed on the non-squish surface. Here, the non-squish surface is closer to the spark plug than the squish surface. When the heat shielding layer is formed on the non-squish surface, it is possible to suppress a heat release from a surface close to the spark plug. In this engine, however, the heat shielding layer is not formed on the squish surface but base material of the cylinder head and the piston is exposed. When the base material of the squish surface is exposed, it is possible to enhance the heat release from a surface far from the spark plug.

JP2017-066996A discloses a spark-ignited internal combustion engine which has two different heat shielding layers on a top surface of a piston. In this engine, the top surface of the piston includes the squish surface and the non-squish surface. On the squish surface, a heat shielding layer which includes ceramics having a hollow structure and a silicon-based binder is formed. On the other hand, a ceramic-based heat shielding layer obtained by spraying is formed on the non-squish surface. According to such the two heat shielding layers, it is possible to suppress the heat release from the squish and non-squish surfaces. In addition, it is possible to increase a heat shielding performance of the non-squish surface than that of the squish surface.

The heat shielding layers mentioned above is able to apply to a compression self-ignited internal combustion engine. The present inventor has been investigated porous alumina (hereinafter also referred to as "alumite") as the heat shielding layer applied to the compression self-ignited internal combustion engine. The alumite is obtained by anodization of the base material of the cylinder head and the piston. The alumite has a lower thermal capacity per unit volume than a general ceramic-based heat shielding layer. Therefore, when the alumite is formed on the top surface of the piston or the bottom surface of the cylinder head, it is possible to enhance a tracking performance of a surface temperature of the heat shielding layer with respect to a gas temperature in a cylinder.

In addition, the alumite has a lower thermal conductivity than the general ceramic-based heat shielding layer. Actually, it was found by the present inventor that a fuel consumption rate in a low-load region of the engine is greatly improved when the alumite is formed on the top surface of the piston or the bottom surface of the cylinder head. However, at the same time, it was found that the fuel consumption rate in a high-load region of the engine is not improved as expected.

The present disclosure addresses the above described problem, and an object of the present disclosure is, to provide a technology to improve the fuel consumption rate in the high-load region of the compression self-ignited internal combustion engine when porous alumina is applied to the engine as the heat shielding layer.

SUMMARY

A first aspect of the present disclosure is a compression self-ignited internal combustion engine and has the following features.

The compression self-ignited internal combustion engine comprises:
a top surface of a piston on which a cavity is formed;
a bottom surface of a cylinder head which faces to the top surface;
a first heat shielding layer which includes porous alumina and is formed on the bottom surface; and
a second heat shielding layer which includes porous alumina and is formed on the top surface.

The first heat shielding layer includes:
a first coating layer in which openings of pores of the porous alumina are covered with a sealant; and
a first exposing layer in which the openings are not covered with the sealant.

The first coating layer is formed on a first cavity surface of the bottom surface which forms a cavity area with the surface of the cavity.

The first exposing layer is formed on a first squish surface of the bottom surface which forms a squish area with the top surface on an outside of the first cavity surface.

A second aspect of the present disclosure has the following features according to the first aspect.

The first exposing layer is thicker than the first coating layer.

A third aspect of the present disclosure has the following features according to the first aspect.

The second heat shielding layer includes:
a second coating layer in which openings of pores of the porous alumina are covered with a sealant; and
a second exposing layer in which the openings are not covered with the sealant.

The second coating layer is formed on a surface of the cavity.

The second exposing layer is formed on a second squish surface of the top surface which forms the squish area with the first squish surface.

A fourth aspect of the present disclosure has the following features according to the third aspect.

The second exposing layer is thicker than the second coating layer.

According to the first aspect, the first exposing layer is formed on the first squish surface. Therefore, in an expansion stroke of the engine, it is possible to reduce cooling loss by utilizing the low thermal conductivity inherent in the porous alumina of the first exposing layer. Also, in strokes of the engine other than the expansion stroke, it is possible to release heat of combustion gas which reaches the squish area to the cylinder head via the first exposing layer. Therefore, it is possible to improve the fuel consumption rate in the high-load region.

According to the second aspect, the first exposing layer is thicker than the first coating layer. Therefore, it is possible to promote the heat release via the first exposing layer. Therefore, it is further possible to improve the fuel consumption rate in the high-load region.

According to the third aspect, the second exposing layer is formed on the second squish surface. Therefore, in the strokes other than the expansion stroke, it is possible to release the heat of the combustion gas to the cylinder head via the first and second exposing layers. Therefore, it is possible to improve the fuel consumption rate in the high-load region.

According to the fourth aspect, the second exposing layer is thicker than the second coating layer. Therefore, it is possible to promote the heat release via the second exposing layer. Therefore, it is further possible to improve the fuel consumption rate in the high-load region.

DESCRIPTION OF EMBODIMENTS

Hereinafter, embodiments of the present disclosure will be described based on the accompanying drawings. Note that elements that are common to the respective drawings are denoted by the same reference characters and a duplicate description thereof is omitted.

First Embodiment

A first embodiment of the present disclosure will be described with reference to FIGS. 1 to 5.
1. Description of a Configuration of an Internal Combustion Engine FIG. 1 is a vertical cross-section view of a compression self-ignited internal combustion engine (hereinafter referred to as a "diesel engine") according to the first embodiment.

Figure 1:
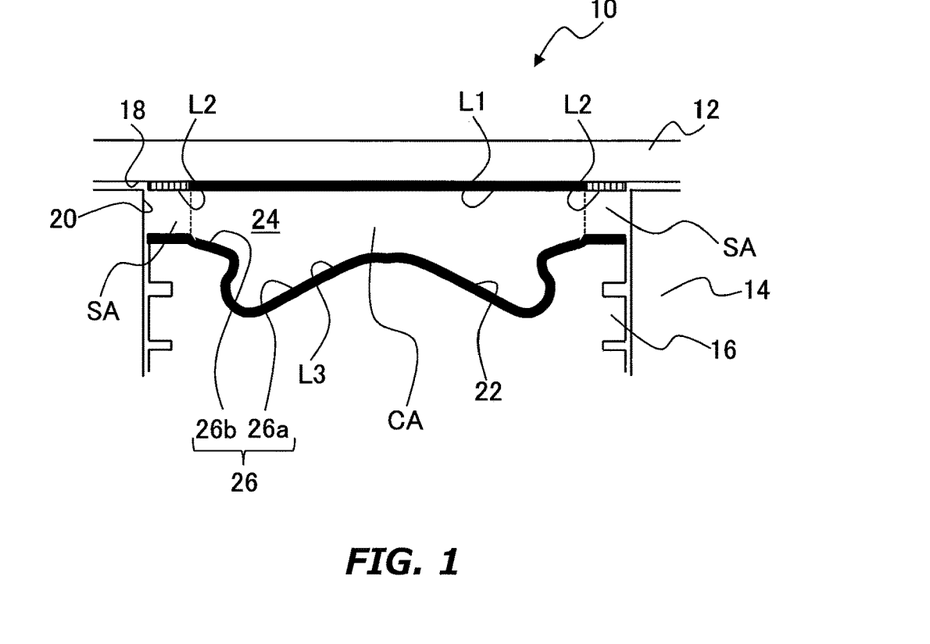
FIG. 1 is a vertical cross-section view of a compression self-ignited internal combustion engine according to a first embodiment of the present disclosure.

The diesel engine 10 shown in FIG. 1 is a four-stroke type reciprocating engine mounted on a vehicle. As shown in FIG. 1, the diesel engine 10 includes a cylinder head 12, a cylinder block 14 and a piston 16. The cylinder head 12 is attached to the cylinder block 14 via a gasket (not shown). The piston 16 is accommodated in a cylinder formed in the cylinder block 14 and moves in the cylinder in a vertical direction.

A bottom surface 18 of the cylinder head 12, an inner peripheral surface 20 of the cylinder block 14 and a top surface 22, forms a combustion chamber 24. At the center of the top surface 22, a cavity 26 is formed. The cavity 26 is also a part of the combustion chamber 24. The cavity 26 includes a recessed portion 26a which is formed in a substantially cylindrical shape and a tapered portion 26b located on the outer periphery of the recessed portion 26a.

The diesel engine 10 includes a space corresponding to the squish area mentioned above. The space corresponds to a narrow space formed between the top surface 22 and the bottom surface 18 on an outside the tapered portion 26b during a compression stroke of the diesel engine 10. In the present specification, this space is also referred to as squish area SA. In the present specification, a space formed between a surface of the cavity 26 (i.e., surfaces of the tapered portion 26b and recessed portion 26a) and the bottom surface 18 is also referred to as a cavity area CA.

In the present specification, a portion of the bottom surface 18 which forms the squish area SA is also called a "first squish surface". Further, a portion of the top surface 22 which forms the squish area SA is also called a "second squish surface". Further, a portion of the bottom surface 18 which forms the cavity area CA is also referred to as a "first cavity surface" and a portion of the top surface 22 which forms the cavity area CA (i.e., the surface of the cavity 26) also called as a "second cavity surface".

On the first and second squish surfaces and the first and second cavity surfaces, heat shielding layers L1 to L3 are formed. The correspondence between the heat shielding layers L1 to L3 and these surfaces is as follows. That is, the heat shielding layer L1 is formed on the first cavity surface. The heat shielding layer L2 is formed on the first squish surface. The heat shielding layer L3 is provided on the second cavity surface and the second squish surface.

Figure 2:
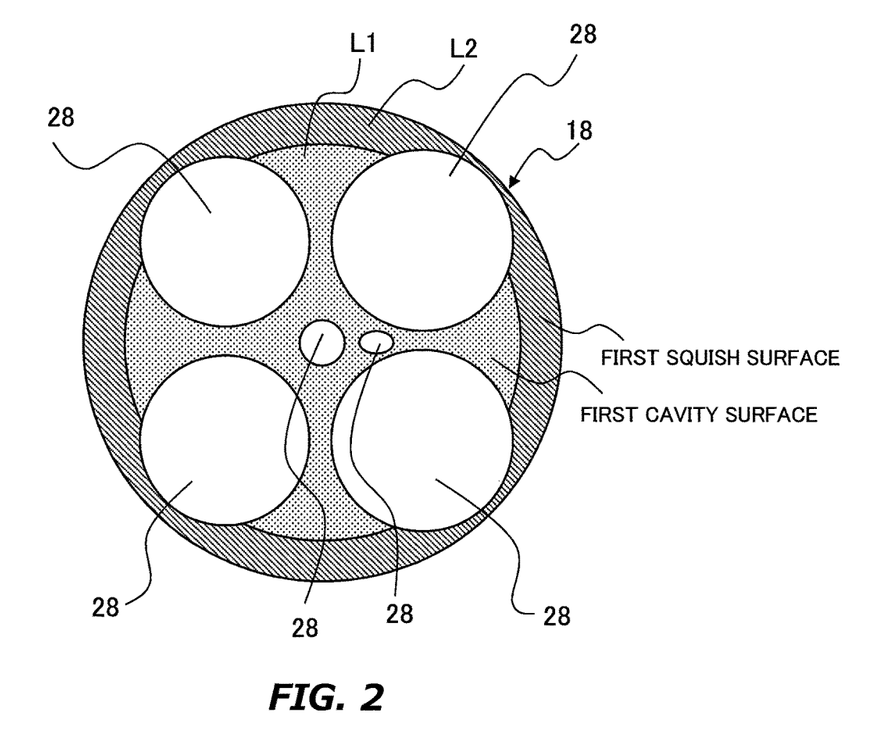
FIG. 2 is a schematic view of a bottom surface of a cylinder head shown in FIG. 1 as seen from a top surface of a piston shown in FIG. 1.
Figure 3:
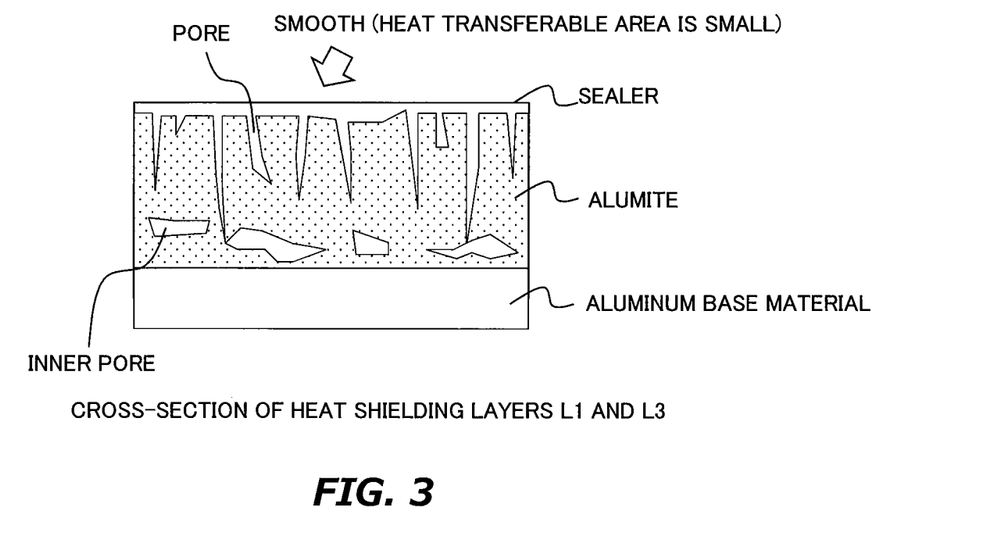
FIG. 3 is a vertical cross-section view of heat shielding layers L1 and L3 shown in FIG. 1.
Figure 4:
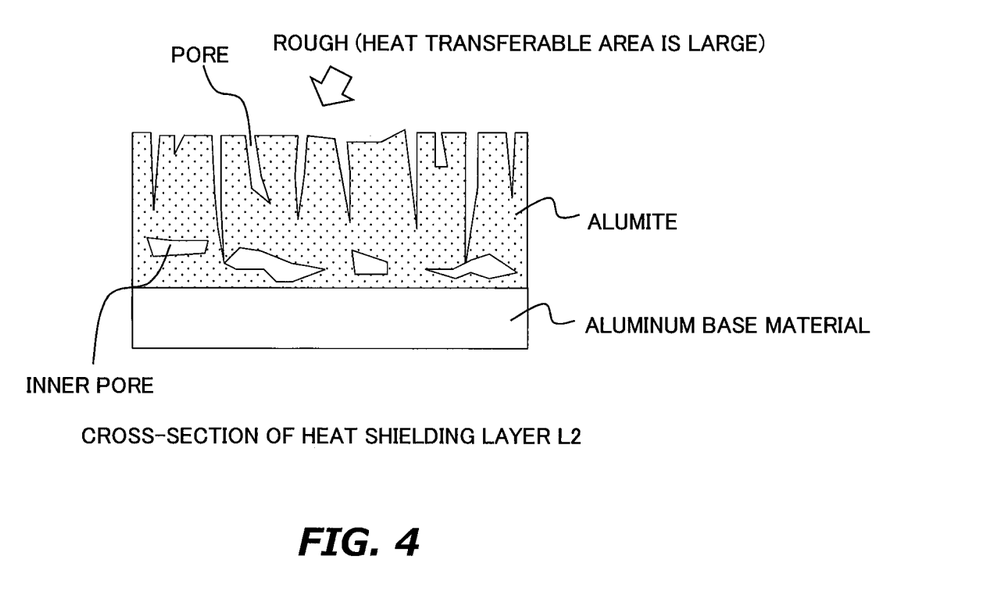
FIG. 4 is a vertical cross-section view of a heat shielding layer L2 shown in FIG. 1.

FIG. 2 is a schematic view of the bottom surface 18 shown in FIG. 1 as seen from the top surface 22 shown in FIG. 1. As shown in FIG. 2, a plurality of apertures 28 are formed in the bottom surface 18. These apertures 28 correspond to ports for providing intake air valves, exhaust valves, fuel injector and glow plug as an auxiliary heat source. As shown in FIG. 2, the first cavity surface has a shape defined by excluding six regions corresponding to the apertures 28 from a circular region which is drawn by projecting an outer edge of the tapered portion 26b onto the bottom surface 18. The second cavity surface has a shape defied by excluding four regions corresponding to the apertures 28 from an annular region which is drawn by projecting the outer edges of the tapered portion 26b and the top surface 26 onto the bottom surface 18.
2. Structure of Heat Shielding Layer FIG. 3 is a vertical cross-section view of the heat shielding layers L1 and L3. FIG. 4 is a vertical cross-section view of the heat shielding layer L2. As shown in FIGS. 3 and 4, the heat shielding layers L1 to L3 are based on alumite. As an example, thickness of the heat shielding layers L1 to L3 is uniformly formed in a range of 100 to 500 μm. As already explained, alumite is porous alumina obtained by anodization of a base material of the cylinder head and the piston (i.e., aluminum base material). As can be seen from FIGS. 3 and 4, alumite has a plurality of pores which open on its surface. The alumite also has inner pores, a part of which connect to the pores on the surface.

The heat shielding layers L1 and L3 include a sealer that seals openings of the pores. As an example, thickness of the sealer in a thickness direction of the heat shielding layer is 5 to 50 μm. The sealer is obtained by coating or baking treatment of a silicon-based polymer solution (e.g., polysiloxane solution and polysilazane solution). Since a part of silicon oxide enters into the pores during the treatment, the sealer and the heat shielding layer are united. Therefore, a boundary between the two is not necessarily clarified. The heat shielding layer integrated with the scaler (i.e., the heat shielding layer L1 or L3) is defined as a "coating layer" in which the openings of the pores are covered with the sealer. On the other hand, the heat shielding layer without the sealer (i.e., the heat shielding layer L2) is defined as an "exposed layer" in which the openings of the pores are exposed to the combustion chamber 24.

3. Effects by Heat Shielding Layers L1 to L3

Since the heat shielding layers L1 and L3 are provided with the sealer, their surfaces which face to the combustion chamber 24 are smooth. Therefore, in the first and second cavity surfaces and the second squish surface, heat of the combustion gas generated around the cavity 26 is prevented from being released to the aluminum base material via the heat shielding layer L1 or L3 immediately after the generation thereof. Therefore, in combination with the low thermal conductivity inherent to the alumite, it is possible to reduce cooling loss. Also, in the second cavity surface, the openings of the pores are covered by the sealer, it is possible to prevent fuel which was injected from the fuel injector to the recessed portion 26a from entering into the pores of the alumite of the recessed portion 26a.

On the other hand, since the sealer is not provided in the heat shielding layer L2, its surface which faces to the combustion chamber 24 is rough. For this reason, in the first squish surface, it is possible to reduce the cooling loss due to the low thermal conductivity inherent to the alumite, while releasing the heat of the combustion gas which reaches the squish area SA to the aluminum base material via the heat shielding layer L2.

As already described, the alumite has low thermal capacity per unit volume, hence tracking performance of the surface temperature of the heat shielding layer with respect to the gas temperature in the cylinder is high. Therefore, in an intake air stroke of the diesel engine 10, the surface temperature should be lowered by following relative low temperature of the intake air inside the cylinder. However, it was turned out by the present inventor that, the heat of the combustion gas tends to remain in the cylinder in a high-load region of a diesel engine as compared with that in a low-load region of the diesel engine. Therefore, it is presumed that this residual heat caused the intake air in the combustion chamber 24 to warm up and to increase pressure in the cylinder, and thus the fuel consumption rate did not improve as expected.

Here, paying attention to a power supply of an internal combustion engine. It is more than acceptable for the power supply if a decrease in the cooling loss is achieved at least in the expansion stroke. In other words, there is no problem even if the heat of the combustion gas is discharged to the outside of the combustion chamber 24 in the strokes other than the expansion stroke (i.e., exhaust, intake air and compression strokes). And according to the heat shielding layer L2, it is possible to promote this heat release regardless of the load region. Therefore, according to the heat shielding layer L2, it is possible to improve the fuel consumption rate in the high-load region.

4. Method for Forming Heat Shielding Layer

Figure 5:
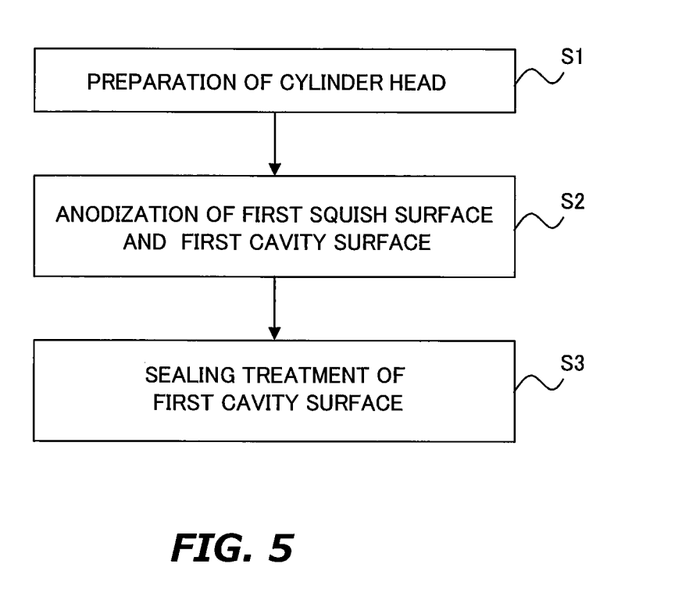
FIG. 5 is a view for explaining an example of a forming method for heat shielding layers L1 and L2 shown in FIG. 1.

FIG. 5 is a view for explaining an example of a method for forming the heat shielding layers L1 and L2. In the example shown in FIG. 5, first, a cylinder head is prepared (step S1). In the step S1, a plurality of cores for forming intake and exhaust ports are arranged inside a matrix. Next, molten metal of aluminum alloy is poured into the matrix. After solidification of the molten metal, remove it from the matrix and provide it to a machine work. Then, the cylinder head is prepared.

Subsequent to the step S1, anodization of the first squish surface and the first cavity surface is performed (step S2). In the step S2, electrolysis is performed while supplying electrolyte (e.g., an aqueous solution of phosphoric acid, oxalic acid, sulfuric acid or chromic acid) to the first squish surface and the first cavity surface. In the electrolysis, a masking jig may be used to limit a contact region of the electrolyte so that alumite is formed only on the first squish surface and the first cavity surface.

Subsequent to the step S2, sealing treatment of the first cavity surface is performed (step S3). In the step S3, first, a silicon-based polymer solution is applied to the first cavity surface. A coating method is not particularly limited and any known methods can be used therefor. The known methods include brush coating, spray coating, dip coating, float coating and spin coating. Upon the coating, a coating region is limited by a masking jig so that a sealer is formed only on the first cavity surface. Next, baking treatment of the sealer is performed. A baking treatment condition is, for example, 5 hours at 180° C. When the baking treatment is completed, a thin layer of silicon oxide is formed on the first squish surface.

Second Embodiment

A second embodiment of the present disclosure will be described with reference to FIGS. 6 and 7.

1. Description of a Configuration of an Internal Combustion Engine

Figure 6:
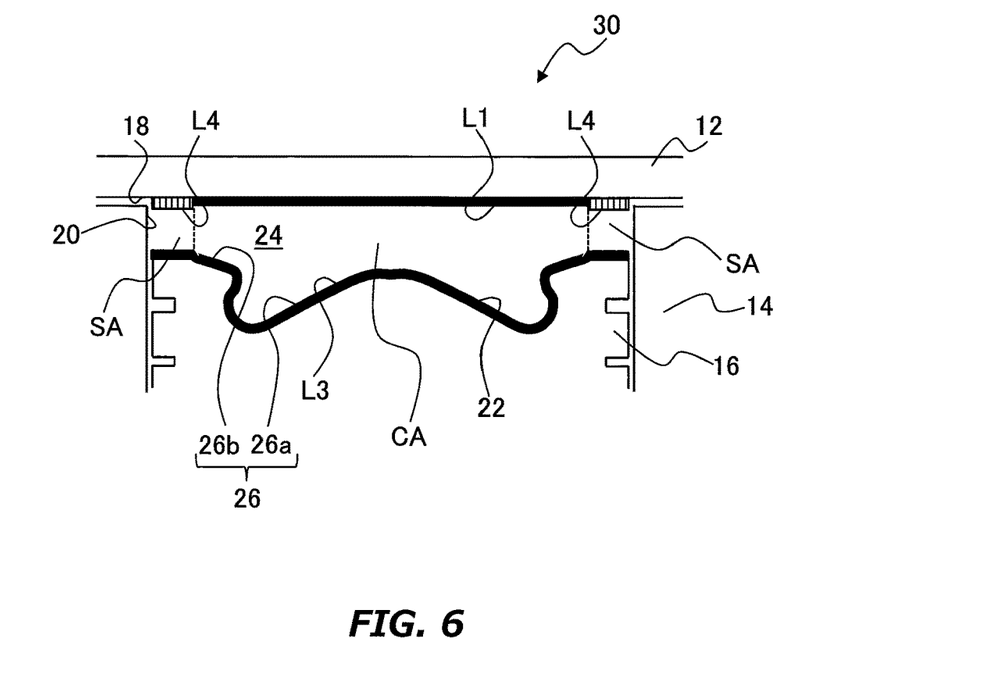
FIG. 6 is a vertical cross-section view of a compression self-ignited internal combustion engine according to a second embodiment of the present disclosure.

FIG. 6 is a vertical cross-section view of a diesel engine according to the second embodiment. The configuration of the diesel engine 30 shown in FIG. 6 is basically the same as the diesel engine 10 shown in FIG. 1. However, in the diesel engine 30, a heat shielding layer L4 is formed on the first squish surface. The heat shielding layer L4 is formed instead of the heat shielding layer L2 shown in FIG. 1.

In the diesel engine 10 shown in FIG. 1, the thicknesses of the heat shielding layers L1 and L2 were uniformly formed. On the other hand, in the diesel engine 30, the heat shielding layer L4 is formed to be thicker than the heat shielding layer L1. The thickness of the heat shielding layer L1 is common between the diesel engines 10 and 30. Therefore, the heat shielding layer L4 is formed to be thicker than the heat shielding layer L2 shown in FIG. 1. As an example, the thickness of the heat shielding layer L4 is set to be 1.2 to 3.0 times the thickness of the heat shielding layer L1.

2. Effects by Heat Shielding Layer L4

As already described, according to the heat shielding layer L2 shown in FIG. 1, it is possible to promote the heat release in the strokes other than the expansion stroke irrespective of the load region. In this respect, since the heat shielding layer L4 is formed to be thicker than the heat shielding layer L2 shown in FIG. 1, it is further possible to promote the heat release. Therefore, according to the heat shielding layer L4, it is further possible to improve the fuel consumption rate in the high-load region.

3. Method for Forming Heat Shielding Layer

Figure 7:
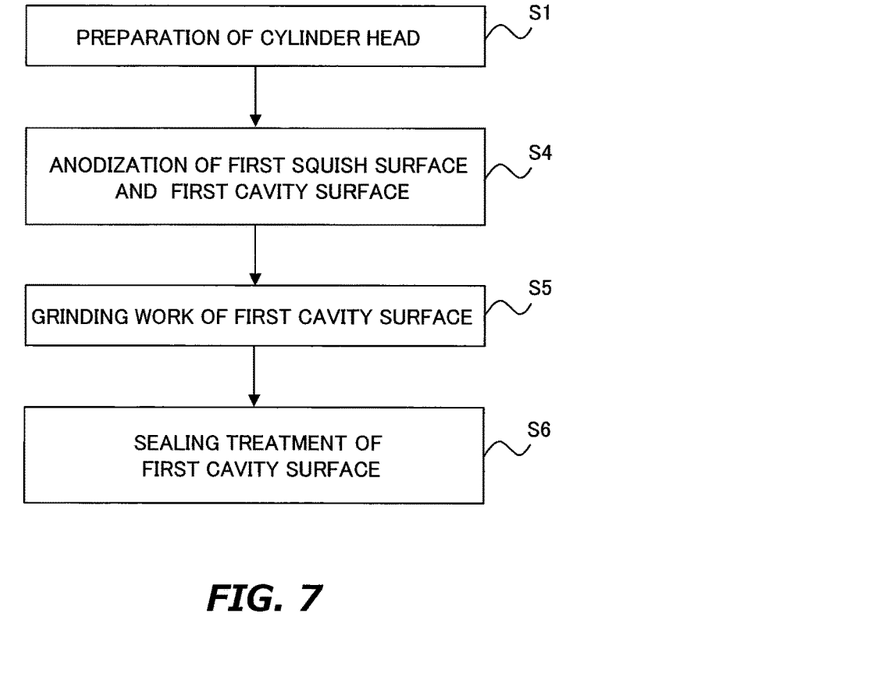
FIG. 7 is a view for explaining an example of a forming method for heat shielding layers L1 and L4 shown in FIG. 6.

FIG. 7 is a view for explaining an example of a method for forming the heat shielding layers L1 and L4. In the example shown in FIG. 7, subsequent to the step S1, the anodization of the first squish surface and the first cavity surface is performed (step S4). The processing in the step S4 is the same as the processing in step S2 described in FIG. 5. However, the electrolysis of the step S4 is performed longer time than the electrolysis of the step S2. When the electrolysis is performed for a longer time, a thicker alumite is formed.

Subsequent to the step S4, a grinding work of the first cavity surface is performed (step S5). In the step S5, the alumite is ground so that the thickness of the alumite formed in the first cavity surface is equal to that of the heat shielding layer L3. A grinding method is not particularly limited and any known methods can be used therefor. The known methods include cutting work using an end mill or the like and surface grinding using a grind stone.

Subsequent to the step S5, the sealing treatment of the first cavity surface is performed (step S6). The processing in the step S6 is the same as that in the step S3 described in FIG. 5. When the baking treatment is completed, a thin layer of silicon oxide is formed on the first squish surface.

Third Embodiment

A third embodiment of the present disclosure will be described with reference to FIG. 8.

1. Description of a Configuration of an Internal Combustion Engine

Figure 8:
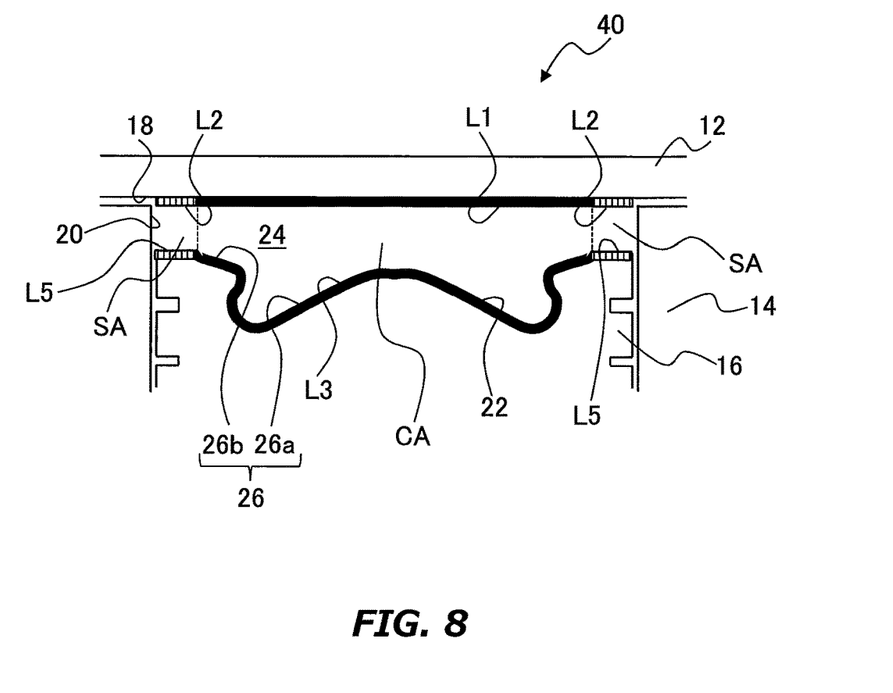
FIG. 8 is a vertical cross-section view of a compression self-ignited internal combustion engine according to a third embodiment of the present disclosure.

FIG. 8 is a vertical cross-section view of a diesel engine according to the third embodiment. The configuration of the diesel engine 40 shown in FIG. 6 is basically the same as the diesel engine 10 shown in FIG. 1. However, in the diesel engine 40, a heat shielding layer L5 is formed on the second squish surface. The point where the heat shielding layer L3 is formed on the second cavity surface is the same as the diesel engine 10 shown in FIG. 1.

The heat shielding layer L5 is disposed opposite to the heat shielding layer L2. The thickness of the heat shielding layer L5 is uniformly formed with the thickness of the heat shielding layers L1 to L3. The configuration of the heat shielding layer L5 is the same as that of the heat shielding layer L2. That is, the heat shielding layer L5 is defined as the exposed layer in which the openings of the pores are exposed to the combustion chamber 24.

2. Effects by Heat Shielding Layer L5

As already described, according to the heat shielding layer L2 shown in FIG. 1, it is possible to promote the heat release in the strokes other than the expansion stroke irrespective of the load region. In this respect, since the configuration of the heat shielding layer L5 has the same structure as that of the heat shielding layer L2 shown in FIG. 1, it is further possible to promote the heat release. Therefore, according to the heat shielding layer L5, it is further possible to improve the fuel consumption rate in the high-load region.

Note that the heat shielding layers L3 and L5 are formed by applying the forming method described with reference to FIG. 5 to the piston.

Fourth Embodiment

A fourth embodiment of the present disclosure will be described with reference to FIG. 9.

1. Description of a Configuration of an Internal Combustion Engine

Figure 9:
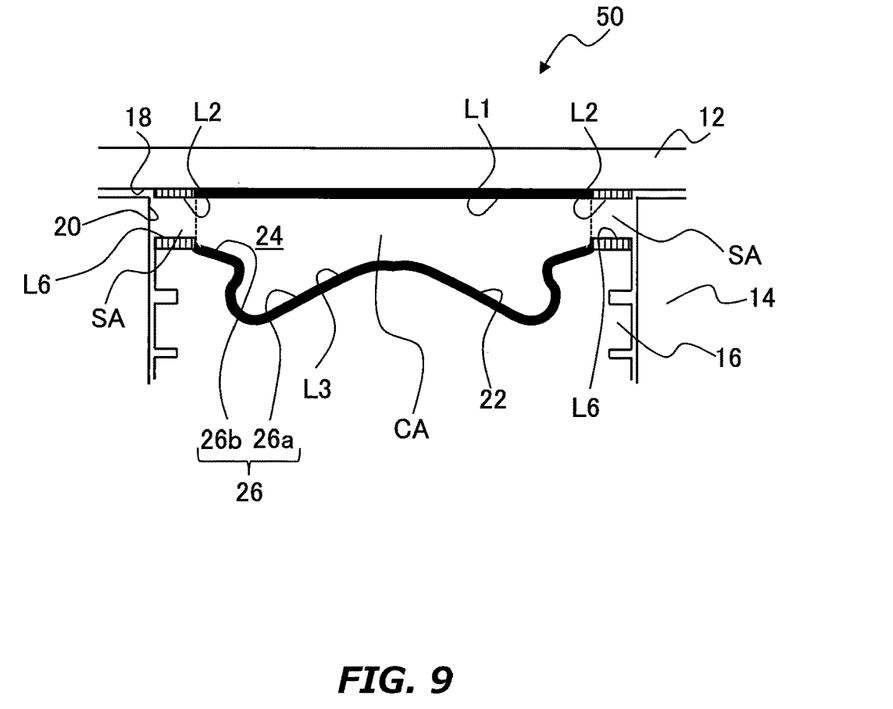
FIG. 9 is a vertical cross-section view of a compression self-ignited internal combustion engine according to a fourth embodiment of the present disclosure.

FIG. 9 is a vertical cross-section view of a diesel engine according to the fourth embodiment. The configuration of the diesel engine 50 shown in FIG. 9 is basically the same as the diesel engine 40 shown in FIG. 8. However, in the diesel engine 50, a heat shielding layer L6 is formed on the second squish surface. The heat shielding layer L6 is formed instead of the heat shielding layer L5 shown in FIG. 8.

In the diesel engine 40 shown in FIG. 8, the thicknesses of the heat shielding layers L3 and L5 were uniformly formed. On the other hand, in the diesel engine 50, the heat shielding layer L6 is formed to be thicker than the heat shielding layer L3. The thickness of the heat shielding layer L3 is common between the diesel engines 40 and 50. Therefore, the heat shielding layer L6 is formed to be thicker than the heat shielding layer L5 shown in FIG. 8. As an example, the thickness of the heat shielding layer L6 is set to be 1.2 to 3.0 times the thickness of the heat shielding layer L3.

2. Effects by Heat Shielding Layer L6

As already described, according to the heat shielding layer L5 shown in FIG. 8, it is possible to promote the heat release in the strokes other than the expansion stroke irrespective of the load region. In this respect, since the heat shielding layer L6 is formed to be thicker than the heat shielding layer L5 shown in FIG. 8, it is further possible to promote the heat release. Therefore, according to the heat shielding layer L6, it is further possible to improve the fuel consumption rate in the high-load region.

What is claimed is:

1. A compression self-ignited internal combustion engine, comprising:
    a top surface of a piston on which a cavity is formed;
    a bottom surface of a cylinder head which faces to the top surface;
    a first heat shielding layer which includes porous alumina and is formed on the bottom surface of the cylinder head; and
    a second heat shielding layer which includes porous alumina and is formed on the top surface of the piston,
    wherein the first heat shielding layer, which is formed on the bottom surface of the cylinder head, includes:
        a first coating layer in which openings of pores of the porous alumina are covered with a sealant; and
        a first exposing layer in which the openings are not covered with the sealant,
    wherein the first coating layer is formed on a first cavity surface of the bottom surface of the cylinder head which forms a cavity area with the surface of the cavity, and
    wherein the first exposing layer is formed on a first squish surface of the bottom surface of the cylinder head which forms a squish area with the top surface of the piston on an outside of the first cavity surface.

2. The internal combustion engine according to claim 1, wherein the first exposing layer is thicker than the first coating layer.

3. The internal combustion engine according to claim 1, wherein the second heat shielding layer, which is formed on the top surface of the piston, includes:
    a second coating layer in which openings of pores of the porous alumina are covered with a sealant; and
    a second exposing layer in which the openings are not covered with the sealant,
    wherein the second coating layer is formed on a surface of the cavity, wherein the second exposing layer is formed on a second squish surface of the top surface of the piston which forms the squish area with the first squish surface.

4. The internal combustion engine according to claim 3, wherein the second exposing layer is thicker than the second coating layer.

5. The internal combustion engine according to claim 1, wherein the cavity includes a recessed portion which is cylindrically shaped, and a tapered portion located on an outer periphery of the recessed portion.

* * * * *